INVENTOR
ROBERT M. BRINK
BY Brumbaugh, Free Graves & Donohue
HIS ATTORNEYS

INVENTOR
ROBERT M. BRINK
BY Brumbaugh, Free Graves & Donohue
HIS ATTORNEYS

Nov. 29, 1960 R. M. BRINK 2,962,550

RESOLUTION RESTORER SYSTEM

Filed Feb. 6, 1957 3 Sheets-Sheet 3

INVENTOR
ROBERT M. BRINK
BY Brumbaugh, Free, Graves & Donohue
HIS ATTORNEYS 2,962,550

RESOLUTION RESTORER SYSTEM

Robert M. Brink, New Canaan, Conn., assignor to Time, Incorporated, New York, N.Y., a corporation of New York Filed Feb. 6, 1957, Ser. No. 638,591

12 Claims. (Cl. 178—7.1)

This invention relates generally to electrooptical systems for scanning a visual image or for both scanning and reproducing this image. More particularly, this invention relates to apparatus adapted to restore lost resolution in the image signal generated by such electrooptical systems.

Figures 1A, 1B, 2A, 2B, 3A, 3B, 4A, 4B, 5A:
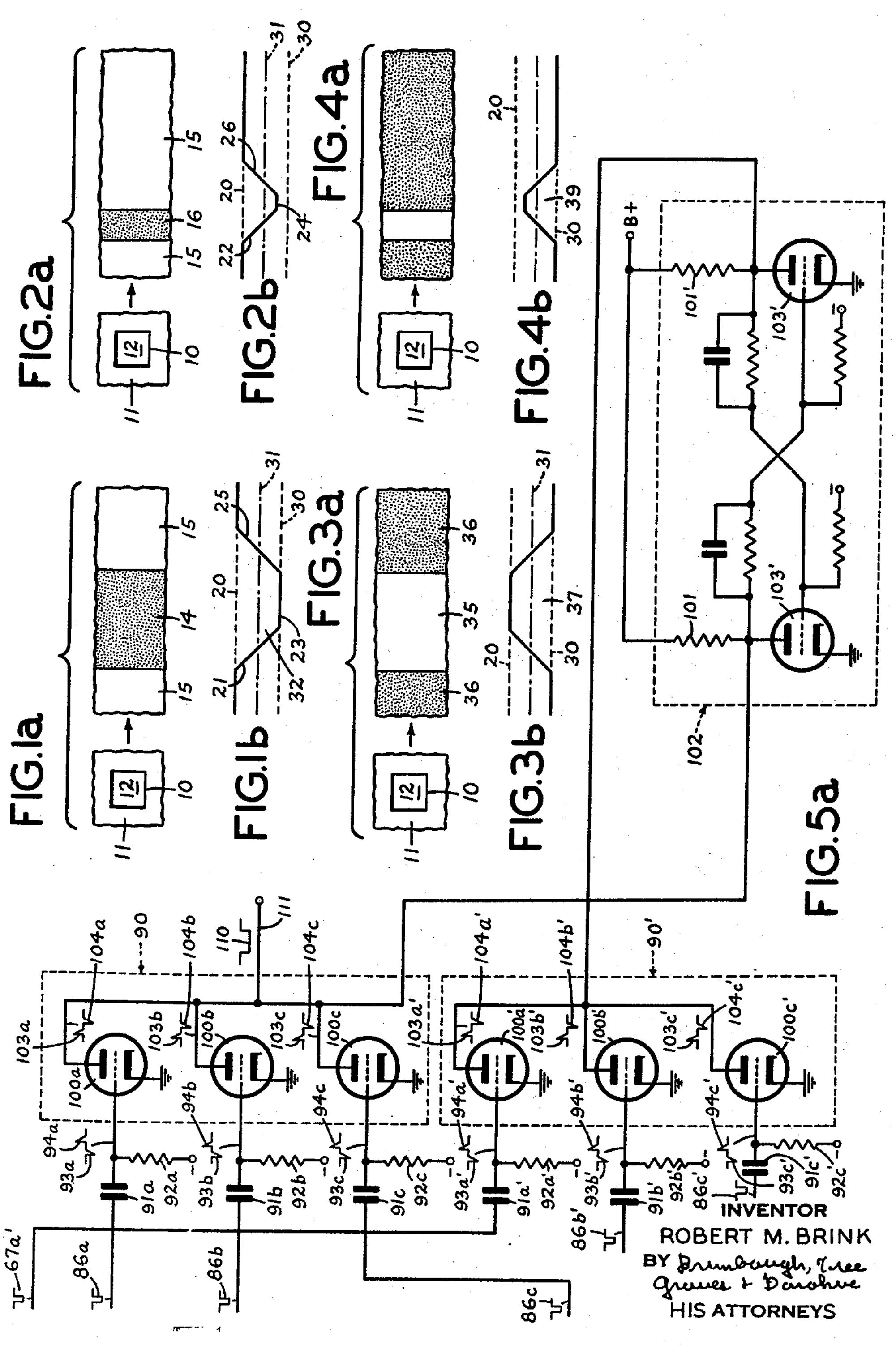
Figure 5:
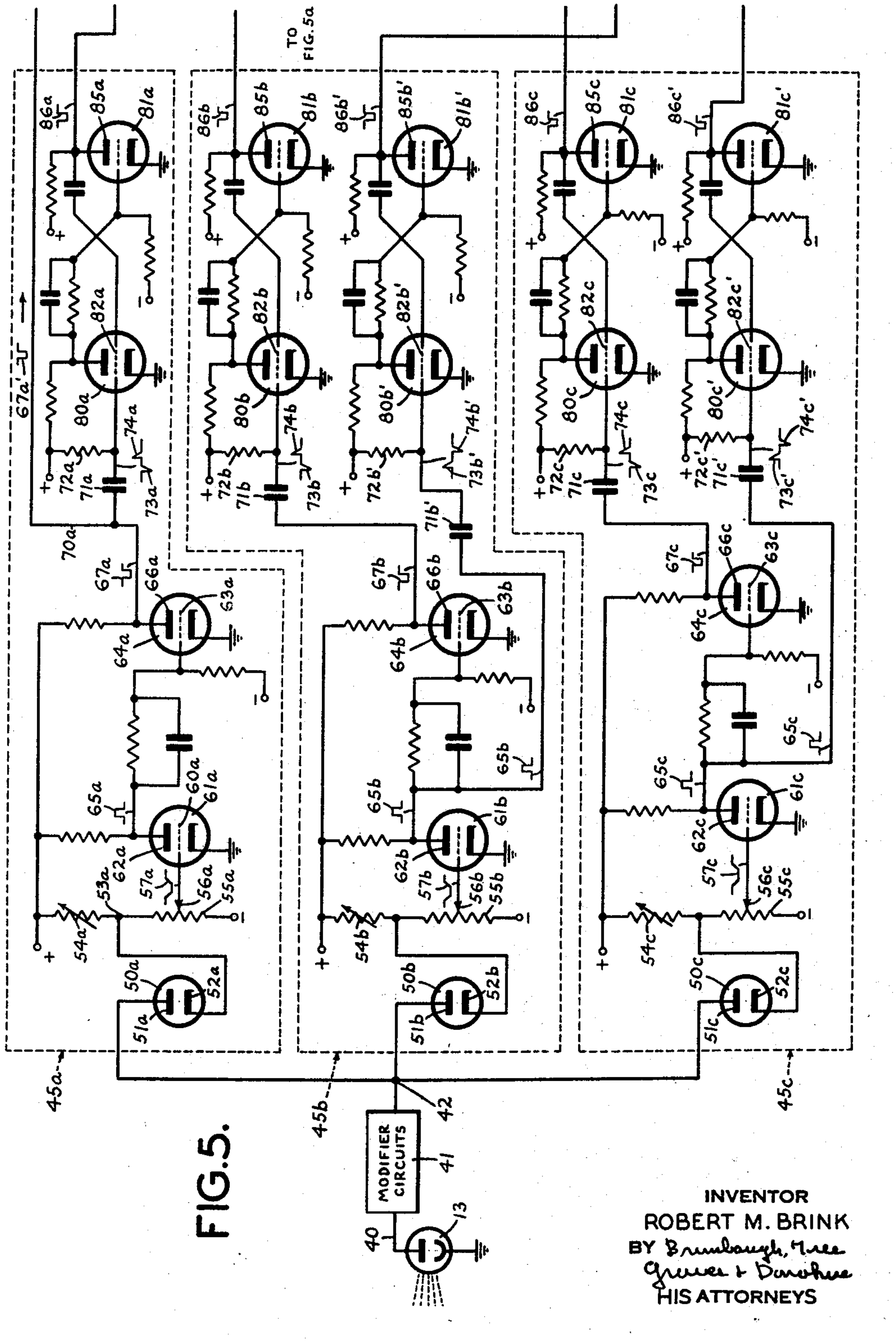
Figure 6:
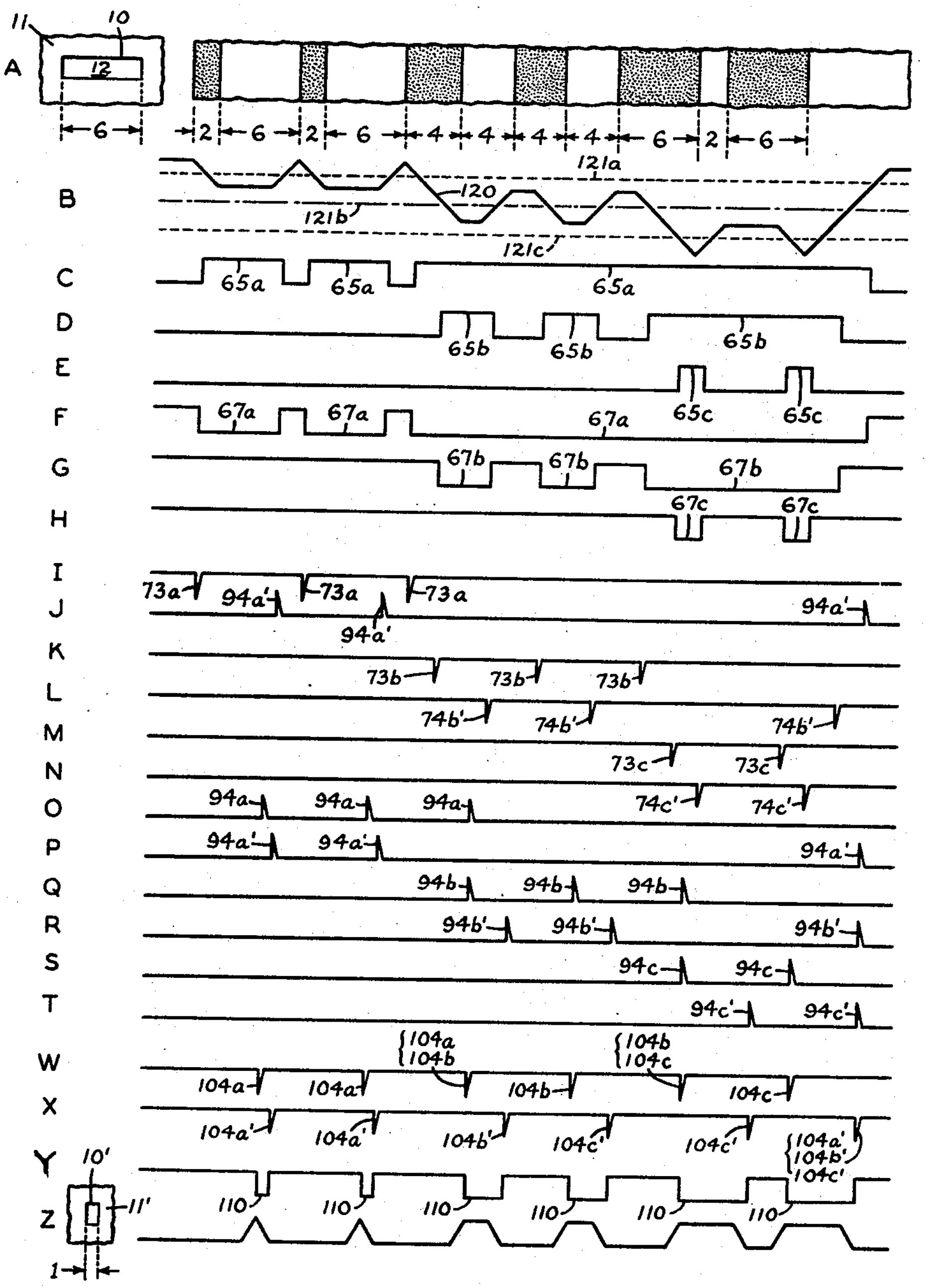

For an understanding of the invention reference is made to the following description and to the accompanying drawings wherein:

Figs. 1*a*, 2*a*, 3*a* and 4*a* are diagrams of different simplified situations which may be encountered in scanning a scanning pattern;

Figs. 1*b*, 2*b*, 3*b* and 4*b* are waveform diagrams accompanying Figs. 1, 2*a*, 3*a* and 4*a*, respectively;

Figs. 5 and 5*a* illustrate, partly in block and partly in schematic form, an exemplary embodiment of a circuit according to the invention; and Fig. 6 is a composite figure consisting of diagrams A–Z which are of aid in explaining the operation of the invention.

The invention herein is of application to any electrooptical system wherein the image to be transmitted and reproduced is dissected by a finite size scanning spot such as exists, for example, when the image is scanned by a light "pencil" or by the electron beam of a cathode ray tube. For convenience, however, the invention herein will be described in connection with an electrooptical system wherein the image is viewed by photoelectric means through a scanning aperture, and wherein the area of the aperture represents the scanning spot.

For further convenience of description, it will be assumed that the image to be dissected, transmitted and reproduced is characterized by a "two-tone" pattern in the sense that the pattern consists of discrete tone areas and that the choice of tonal values for the tone areas is limited to two tones as, say, black and white.

When a two-tone pattern is scanned by a scanning spot, the degree to which any individual tone area of the pattern is resolved by this scanning spot depends on the relative values in the scanning direction of the length of the scanning spot and the width of the tone area. In order to demonstrate this point, assume, as shown in Figs. 1*a* and 2*a*, that a scanning aperture 10 is formed in a diaphragm 11 to define a scanning spot 12, represented by the area of the aperture, and that the light passed by the aperture is translated into an electric signal by a photoelectric cell 13 (Fig. 5). In Fig. 1*a* the aperture is moving perpendicular to a black bar 14 standing out from a white background 15 and of greater width in the scanning direction than the length in this direction of aperture 10, while in Fig. 2*a* the aperture is moving perpendicular to a black bar 16 of lesser width than the length of the aperture. The scanning situations represented by Figs. 1*a* and 1*b* will be designated herein as, respectively, the "overwidth" and the "underwidth" situations.

In both Figs. 1*a* and 2*a*, before the leading edge of the aperture reaches the bar, the photocell will see all white, and the output signal from the photocell will remain constant at a maximum value 20 (Figs. 1*b* and 2*b*) representing reference "white." As the leading edge of the aperture traverses the near edge of the bar and moves into the black area thereof, the photocell signal will be characterized by a negative-going portion 21 (Fig. 1*b*) or 22 (Fig. 2*b*) which corresponds to the continuously increasing amount of black which is framed by the aperture. This negative-going portion is terminated by the leveling off of the photocell signal either when, in the overwidth situation, the lagging edge of the aperture reaches the near side of the bar or when, in the underwidth situation, the leading edge of the aperture reaches the far side of the bar. The photocell signal so remains level during a waveform portion 23 (Fig. 1*b*) or 24 (Fig. 2*b*) until, in the overwidth situation, the leading edge of the aperture traverses the far side of the bar or until, in the underwidth situation the lagging edge of the aperture reaches the near side of the bar. In either situation, the photocell signal then rises from its previously assumed level in such manner that the waveform of the signal has a positive-going portion 25 (Fig. 1*b*) or 26 (Fig. 2*b*) which terminates at the reference "white" level 20 and which is of the same duration as the previously-described negative-going portion of the waveform.

Thus, in both the overwidth and underwidth situations the interval of the waveform which represents a black bar on a white background is of trapezoidal shape (or of triangular shape for the transition case where the width of the bar equals the length of the aperture). Also, in both situations, the larger base of the trapezoid is formed at the reference "white" level of the photocell signal. These similarities which exist between the respective waves obtained in the two situations are, however, relatively unimportant in comparison to the differences therebetween. These differences will now be discussed.

In the overwidth situation, the smaller base of the trapezoidal wave is generated during a finite time period when the aperture is seeing all black. Hence, whenever an overwidth situation exists, the smaller base 23 (Fig. 1*b*) of the trapezoidal wave will always be formed at a fixed value, minimum level 30 for the photocell signal representing reference "black." Also, in the overwidth situation the durations of the larger and smaller bases of the trapezoidal wave will be given respectively by the expressions $(w+l)/s$ and $(w-l)/s$ where $w$, $l$ and $s$ respectively represent the width of the bar in the scanning direction, the length of the aperture in this direction, and the scanning speed.

From the foregoing, it will be evident that, in every overwidth situation it is necessary, in order to obtain a proportional measure of the width of the black bar, to do only the following. First, establish by an appropriate slicer circuit a fixed slicing level 31 (Fig. 1*b*) halfway between the reference "white" level 20 and the reference "black" level 30. Second, slice off the larger part of the two parts into which the trapezoidal wave is divided by the slicing level so that the output wave from the slicer circuit will be a trapezoid 32 having the same smaller base 23 as before, but having a new larger base, at the slicing level, whose duration will be $w/s$ in accordance with the well-known geometry theorem that a trapezoid at its mid-section has a width equal to half the sum of the width of its larger and smaller bases. Third, "square-up" this new trapezoidal wave 32 by amplifying and clipping to produce a square wave whose duration between its leading and lagging edges will have the same value $w/s$ as the duration of the larger base of the trapezoidal output wave from the slicer circuit. Fourth, utilize the duration of this square wave as a proportional measure of the width of the black bar.

While the technique just described is suitable in the overwidth situation to eliminate "aperture spread" in an image signal representing a black bar on a white background, it is not suitable to correct for this "aperture spread" when, as shown in Fig. 3*a*, the image signal represents a white bar 35 on a black background 36. This is so since, when the scanned image is a white bar on black, the photocell signal will represent the white bar by a trapezoidal wave (Fig. 3*b*) whose larger and smaller bases will respectively be at the reference "black" and the reference "white" levels. If such trapezoidal wave is fed through the described slicer circuit, the circuit will pass the larger portion 37 rather than the smaller portion of the wave, and the ensuing "squaring-up" operations will accordingly produce a square wave having a duration of $(w+l)/s$ rather than the desired duration of $w/s$.

Let us turn now to the underwidth situation represented by Figs. 2*a* and 2*b*. In this underwidth situation of a black bar on a white background, the smaller base of the trapezoidal wave will never be at the reference "black" level 30. This is so, since when the aperture scans a black bar of a width less than the aperture length in the scanning direction, the aperture will at all times see some of the white background. It follows that, instead of the smaller base 24 of the trapezoidal wave reaching the reference "black" level 30, the said smaller base will always be at a level less than reference "black" and will vary in level in accordance with the relative proportions of black and white which are seen by the aperture during the generation of the smaller base. Moreover, in any underwidth situation, the respective durations of the larger and smaller bases of the trapezoidal wave will be given by the expressions $(l+w)/s$ and $(l-w)/s$ rather than by the expressions $(w+l)/s$ and $(w-l)/s$ which are appropriate to the overwidth situation. Thus it is not feasible, where the width of the black bar is less than the aperture length in the scanning direction, to obtain a proportional measure of the bar width by the simple technique which has previously been described in connection with Figs. 1*a* and 1*b*. Moreover, if the underwidth bar which is scanned is a white bar on a black background (Fig. 4*a*), the additional difficulty is presented that the slicer circuit will slice off the wrong portion 39 of the trapezoidal wave (Fig. 4*b*) in exactly the same manner as the wrong portion is sliced off in the corresponding overwidth situation (Figs. 3*a* and 3*b*).

So far there have been considered only the relatively simple scanning situations wherein the pattern to be scanned consists of a single-tone area (e.g., a bar) of one tonal value contrasting with a background of another tonal value.

In many instances, however, the pattern to be electrically transmitted takes the form of a plurality of first-tone areas which are of the same tone density inter se, and which are separated from each other in the scanning direction by a plurality of interleaved second tone areas which are of different tone density than the first tone areas, but which are all of the same tone density inter se. In such patterns, both the first tone areas and the second tone areas may be of differing width in the scanning direction. Patterns of this sort are provided, for example, by black and white copy in the nature of type copy or half-tone picture copy. As illustrated by the examples just given, the patterns under consideration may be described as patterns which present a "repetitive two-tone pattern" to a scanning spot which is created by, say, an aperture.

It is often the case that the only aperture available for scanning such repetitive two-tone patterns is an aperture whose length in the scanning direction is greater than the width of one, some, or all of the tone areas of the pattern. When the aperture length does so exceed the width of a scanned tone area in a repetitive pattern, the difficulties which arise in seeking to correct for loss of resolution in the image signal are somewhat the same as those previously discussed in connection with Figs. 3*a*, 3*b* and Figs. 4*a*, 4*b*, but are compounded by the presence of the complication that in scanning a repetitive two-tone pattern of, say, alternate black and white bars, the aperture may, at certain times, be straddling an underwidth black bar having white on either side, and may, at other times, be straddling an underwidth white bar having black on either side. This change in the course of scanning a pattern from a straddling by the aperture of black bars to straddling by that aperture of white bars is equivalent to a change in the same pattern from scanning black bars on a white background to scanning white bars on a black background. As yet, one more complication which arises out of this straddling possibility, a given width black bar in the repetitive pattern, will not everywhere in the pattern be represented by a waveform interval of the photocell signal of constant configuration, but will, instead, be represented by a waveform interval which varies in configuration in dependence on the width of the preceding white bar.

Nonetheless, since a great deal of copy to be reproduced can be considered as copy which is characterized by the described repetitive two-tone pattern, there is need for a way of restoring resolution in an image signal representing one or more scanned underwidth tone areas even though these scanned tone areas appear in a repetitive two-tone pattern.

It is, accordingly, an object of the invention to provide methods and apparatus for restoring resolution in an image signal derived from the scanning of one or more discrete tone areas of which one, some, or all have widths in the scanning direction which are lesser than the dimension of the scanning spot in this direction.

Another object of the invention is to provide methods and apparatus to so restore resolution in the instance where the said discrete tone areas form a repetitive two-tone pattern.

Yet another object is to provide methods and apparatus wherein, in addition to restoring resolution thus lost to the image signal, the signal is given an anticipatory correction which offsets the loss of resolution incurred when the signal is utilized at the receiving end of the transmission-reception system to reproduce the scanned pattern.

These and other objects are realized according to the invention in its apparatus aspect by providing an electrical junction at which appears the image signal of time-varying waveform generated by the photocell, a reconstituting circuit, and a plurality of channels through which the signal on the junction may reach the reconstituting circuit after being operated on in each of the channels. The several channels are designed to be operated at different threshold levels at which the channels will pass the signal, and, accordingly, the distribution of conduction among the channels of any given waveform interval, representing a scanned tone area of a particular width, will be determined by the level or levels assumed by this waveform interval. Thus, in effect, the several channels serve to classify successive waveform intervals in accordance with level.

The several channels are also appropriately designed to modify the waveform intervals which pass therethrough in a different preselected manner for each channel whereby any loss of resolution in a particular waveform interval is restored thereto. To state it another way, the several channels selectively restore resolution to the waveform intervals which have been classified by level in accordance with the classification thereof. Resolution may be successfully restored in this manner to each particular waveform interval inasmuch as there is a definite correlation between the particular level or levels manifested by the waveform intervals and the width of the scanned tone areas which are represented by the intervals.

After the channels have operated on the waveform intervals to restore resolution therein, the waveform intervals are fed from the channels to the reconstituting circuit. The reconstituting circuit responds to these intervals to regenerate the complete time-varying waveform of the original image signal in such manner that the reconstituted signal is a signal wherein there has been restored the loss of resolution incurred during scanning of the original image signal.

As a feature according to the invention, the described apparatus may be designed not only to restore resolution which has been lost in the scanning of the original pattern, but, in addition, to introduce into the signal an anticipatory correction for resolution which would otherwise be lost when the signal is utilized at the receiving end of the system to reproduce the original pattern.

For a more complete understanding of the invention, reference is made to Fig. 5 which discloses an exemplary embodiment of the invention. In this embodiment, the light which is passed by the aperture 10 (shown in Fig. 1*a*, for example) is translated by the photocell 13 into an electric signal on lead 40. In the usual electrooptical system, this original output or "image" signal from the photocell will be modified in various respects by certain modifier circuits 41 which are not part of the invention herein, but which may, say, impress the photocell signal as a modulation envelope on a high frequency carrier, amplify the modulated carrier, and then rectify the carrier to recover the modulation envelope of the image signal. This image signal with its time varying waveform is supplied to a junction 42 connected to the output of the modifier circuits 41.

From junction 42, the image signal is fed to three separate channels **45*a*, 45*b* and 45*c*. Except as later noted, each of these three chanels is identical in circuit arrangement. Accordingly, only the components of channel 45*a* will be described in detail. It will be understood, however, that, unless the context otherwise requires, the said description shall also be taken to apply to any components of channels 45*b* and 45*c* which are counterparts of described components in channel 45*a***. Elements in the three channels which are counterparts are designated by the same reference numeral but by different letter or "prime" suffixes to the numerals.

The first stage of channel **45*a* comprises a slicer circuit which is formed of a diode 50*a* having its anode 51*a* connected to junction 42 and its cathode 52*a* connected to the junction 53*a* of a variable resistor 54*a* and a potentiometer 55*a* having a tap 56*a*. The resistor 54*a* and the potentiometer 55*a* are connected in series between a positive voltage supply and a negative voltage supply whereby the D.C. voltage at junction 53*a* may be adjusted to a desired value by varying the resistance of resistor 54*a*. This D.C. voltage at junction 53*a* acts as a reverse bias for the diode 50*a***.

Assuming that the reference "white" level for the image signal at junction 42 is at 40 volts, the reverse bias impressed on diode **50*a* is, say, 30 volts. As long as the image signal is derived from the scanning of a white background, the image signal level will stay at about 40 volts, the diode 50*a* will conduct, and substantially all of the 40 volt signal will appear across potentiometer 55*a*. When, however, a black bar is scanned, the image signal at junction 42 represents this black bar by a trapezoidal waveform interval which consists of an initial negative-going portion during which the signal drops from 40 volts to some value less than 30 volts, a middle portion during which the signal remains constant at this value, and a final positive-going portion during which the signal rises from the mentioned value towards 40 volts. The trapezoidal waveform interval so developed at junction 42 will be reproduced across potentiometer 55 so long as the wave level stays above 30 volts to permit diode 50*a* to conduct despite the 30-volt reverse bias impressed thereon. This reverse bias does, however, block conduction of the signal through the diode during the period when the waveform of the signal has a level below 30 volts. Accordingly, the discussed waveform interval as it appears at junction 53*a* will be sliced at the 30-volt slicing level. A fraction of this sliced trapezoidal waveform interval at junction 53*a* will appear at tap 56*a* as the waveform 57*a***.

The tap **56*a* of potentiometer 55*a* is connected to the grid 60*a* of a normally conducting triode 61*a* which operates as a first overdriven amplifier stage. The plate 62*a* of this triode is connected through a resistance capacitance coupling with the grid 63*a* of a normally cutoff triode 64*a* which operates as a second overdriven amplifier stage. These two overdriven amplifier stages serve to "square up" the trapezoidal waveform 57*a* so that the wave form appears at the plate 62*a* as a positive-going square wave 65*a* and at the plate 66*a* of triode 64*a* as a negative-going square wave 67*a***.

The square wave **67*a* is simultaneously applied to a lead 70*a* and to a differentiator circuit comprised of a capacitor 71*a* and a resistor 72*a*. As later described, the lead 70*a* acts to connect the square wave 67*a* with zero time delay to points further on in the Fig. 5 circuit. (For reasons which will later be apparent, the square wave 67*a* when on lead 70*a* will be designated as the square wave 67*a'*.) The differentiator circuit, on the other hand, diverts the square wave signal 67*a* into a path wherein a time delay is developed. To the end of producing this time delay, the differentiator circuit comprised of elements 71*a* and 72*a* forms a pair of pulses 73*a* and 74*a* by the usual electrical action of such differentiator circuit. Of this pair of pulses, the leading pulse 73*a* is a negative pulse which is used for triggering, whereas the lagging pulse 74*a* is a positive pulse which is inherently generated by the differentiator circuit 71*a*, 72*a*** but which is superfluous to the operation of the Fig. 5 circuit.

The time delay unit in channel **45*a* is provided by a conventional monostable multivibrator whose principal components are the triodes 80*a* and 81*a*. In the normal or "off" state of the multivibrator, the triode 80*a* is conducting while the triode 81*a* is nonconducting. As shown in Fig. 5, the grid 82*a* of the normally conducting triode 80*a* is connected to the output of the differentiator circuit 71*a*, 72*a* to receive the pair of pulses 73*a*, 74*a* developed by this last-named circuit. Of these two pulses, the leading negative pulse 73*a* will cut off triode 80*a* to trigger the multivibrator to the "on" state whereas the lagging positive pulse 74*a*** will have no effect upon the multivibrator operation.

One of the attributes of the change in the multivibrator from "off" to "on" is a change in triode 81 from a state of nonconduction to a state of conduction. This change from nonconduction to conduction drops the voltage at the plate **84*a* of triode 81*a* from the supply voltage value to some greatly lowered value, and the plate 85*a* remains at this lowered value until the "on" state of the multibrator is terminated. It will thus be seen that the waveform appearing at plate 85*a* will be a negative-going square wave 86*a* whose leading edge is substantially coincident in time with the negative pulse 73*a* produced by the differentiator circuit. The lagging edge of the square wave 86*a* will thus be delayed in time with respect to the pulse 73*a* by an amount corresponding to the period during which the monostable multivibrator remains in its "on" state. As is well known, by selecting appropriate circuit constants for the multivibrator, the length of this "on" period can be varied over a substantial range. As later described in further detail, the lagging edge of the square wave 86*a* is considered to represent a time-delayed manifestation of the pulse 73*a*, and the circuit constants of the multivibrator are selected to give between the mentioned lagging edge and the pulse 73*a*** an amount of time delay which is appropriate to restore resolution in the image signal.

Channels **45*b* and 45*c*** will now be considered. Each of these last-named channels has counterparts to the slicer circuit, first and second overdriven amplifier stages, differentiator circuit and monostable multivibrator which are in channel 45a and which have just been described. In channel 45a the counterparts are the slicer circuit formed of elements 50b, 54b, 55b and providing the trapezoidal output 57b, the triode 61b providing the positive square wave 65b, the triode 64b providing the negative square wave 67b, the differentiating circuit of capacitor 71b and resistor 72b providing the pair of pulses 73b, 74b and the monostable multivibrator formed of triodes 80b, 81b and providing the square wave output 86b. In channel 45c these counterparts are the slicer circuit formed of elements 50c, 54c, 55c and providing the trapezoidal output 57c the triode 61c providing the positive square 65c, the triode 64c providing the negative square wave 67c, the differentiating circuit of capacitor 71c and resistor 72c providing the pair of pulses 73c, 74c, and the monostable multivibrator formed of triodes 80c, 81c and providing the square wave output 86c.

As a difference between the three channels, however, the zero time delay path provided by lead 70a in channel 45a is replaced in channels 45b and 45c by paths which provide finite time delays and which are in parallel, respectively, with the time-delay paths provided by the monostable multivibrators formed by triodes 80b, 81b and triodes 80c, 81c in these two last-named channels. Since the extra time-delay path for channel 45b is substantially identical in circuit arrangement with the extra time-delay path for channel 45c, only the former time-delay path will be described.

In channel 45b as in channel 45a, the signal appearing at the plate of the first overdriven amplifier triode is a positive-going square wave designated 65b in channel 45b. In contrast to channel 45a, however, in channel 45b the square wave 65b is fed not only to the second overdriven amplifier triode 64b, but in addition is fed to a differentiator circuit which is formed of a capacitor 71b′ and a resistor 72b′. This last-named differentiator circuit is a substantial counterpart of the differentiator circuit 71b, 72b in channel 45b. The differentiator circuit 71b′, 72b′ operates on the square wave 65b to produce a pair of pulses 73b′, 74b′. Of these pulses, the leading pulse 73b′ is a positive pulse which is superfluous to the operation of the Fig. 5 circuit, whereas the lagging pulse is a negative pulse which is used as a trigger pulse.

The differentiator circuit 71b′, 72b′ operates a time-delay unit in the form of a monostable multivibrator whose principal components are the triodes 80b′ and 81b′. This monostable multivibrator operates like the others in the Fig. 5 circuit in that the multivibrator is normally in an "off" state, wherein the triode 80b′ is conducting and the triode 81b′ is nonconducting, but can be triggered to the "on" state by a negative pulse. The discussed multivibrator is also like the others in the Fig. 5 circuit in that the discussed multivibrator, when triggered to the "on" state, develops at the plate 85b′ of triode 81b′ a square wave 86b′ whose duration is of the same length as the "on" period of the multivibrator. As before, the duration of square wave 86b′ can be made to be of selected value by appropriately selecting the circuit constants of the multivibrator.

The multivibrator formed by triodes 80b′, 81b′ in channel 45b differs, however, in the following respect from the multivibrator formed of triodes 80a, 81a in channel 45a and from the multivibrators in channels 45b and 45c which are the counterparts of the last-named multivibrator in channel 45a. In the previously discussed multivibrator 80a, 81a it will be recalled that the multivibrator is triggered by the leading pulse from the preceding differentiator circuit. However, in the multivibrator 80b′, 81b′ which is now being discussed, the multivibrator is triggered by the lagging pulse from the preceding differentiator circuit inasmuch as the multivibrator is triggered only by a negative pulse, and inasmuch as it is the lagging pulse which is negative. Hence, in the square wave output 86b′, the lagging edge of the square wave represents a delayed manifestation of the lagging pulse from the preceding differentiator circuit. They delay effect provided by multivibrator 80b′, 81b′ is thus different from the delay effect provided by multivibrator 80a, 81a wherein the lagging edge of the output square wave 86a is a delayed manifestation of the leading pulse from the preceding differentiator circuit.

Channel 45c resembles channel 45b in that channel 45c has a delay path including a differentiator circuit 71c′, 72c′ and a monostable multivibrator circuit whose principal components are the triodes 80c′ and 81c′. This delay path provides as an output signal the square wave 86c′. This last-named differentiator circuit and last-named multivibrator in channel 45c are counterparts of the differentiating circuit 71b′, 72b′ and the monostable multivibrator 80b′, 81b′ which have already been described in connection with channel 45b.

Having discussed the differences in circuitry which exist between channel 45a and channels 45b, 45c, it would now be appropriate to mention certain differences in operating characteristics which exist between all three channels. It will be recalled that the diode 50a of channel 45a was stated to have a 30-volt reverse bias impressed thereon. The diodes 50b and 50c also have reverse biases impressed thereon, but these reverse biases are not the same as that used for diode 50a. Instead, in the array of channels 45a, 45b, 45c the reverse bias on the slicer diode is progressively reduced in value so that, say, the reverse bias on diode 50b is 20 volts, and the rverese bias on diode 50c is 10 volts. As another difference in operating characteristic between all three channels, the monostable multivibrators shown in the Fig. 5 circuit differ among themselves with regard to their respective circuit constants, so that each multivibrator has a different length of "on" period from the other multivibrators. The manner in which the various values of "on" period for the different multivibrators are selected is a matter which will be latter described.

From the foregoing, it will be seen that the three channels 45a, 45b, 45c provide six square wave outputs, namely the square wave 67a′ and the square waves 86a, 86b, 86c, 86b′ and 86c′. In three of these outputs, namely the outputs 86a, 86b and 86c, the lagging edge of the square wave is utilized as a delayed manifestation of the leading pulse of the pair of pulses, which is supplied to the delay multivibrator which produces the square wave. Hence, by tracing back time relations through the Fig. 5 circuit, it will be seen that the lagging edges of the square waves 86a, 86b, 86c are delay manifestations of, respectively, the leading, negative-going slopes of the sliced trapezoidal waves 57a, 57b and 57c which are developed at the output of the slicer circuits in channels 45a, 45b, 45c. The three other uotputs of the channel, namely the outputs 67a′, 86b′ and 86c′, are square waves whose lagging edges are utilized as manifestations of, respectively, the lagging, positive-going slopes of the sliced trapezoidal waves 57a, 57b, 57c. In the case of the square waves 86b, 86b′, there is a delayed time relation between the lagging edges of the square waves and the portions of the trapezoidal waves 57b, 57c which these lagging edges represent. In the case of the square wave 67a′, the lagging edge of this square wave represents with substantially zero time delay the lagging slope portion of the trapezoidal wave 57a.

Of the six outputs from the three channels, the three square wave outputs 86a, 86b, 86c are supplied to a mixer circuit 90 (Fig. 5a) while the other three square wave outputs 67a′, 86b′, 86c′ are supplied to a separate but similar mixer circuit 90′. Each output before being applied to its associated mixer circuit is passed through a differentiator circut whch translates the leading and lagging edges of the output square wave into, respectively, a leading negative pulse and a lagging positive pulse. Thus, for example, the square wave output 86a, before being applied to mixer circuit 90, is passed through a differentiator circuit formed of a capacitor 91a and a resistor 92a. This differentiator circuit translates the leading and lagging edges of the square wave 86a into, respectively, a negative leading pulse 93a and a positive lagging pulse 94a. The square wave outputs 86b, 86c, 67a', 86b' and 86c' are similarly differentiated to provide the pulse pairs 93b and 94b, 93c and 94c, 93a' and 94a', 93b' and 94b', and 93c' and 94c'.

The pulse pairs so derived from the outputs 86a, 86b, 86c are respectively applied to the grids of three triodes 100a, 100b, 100c within the mixer circuit 90. Similarly, the pulse pairs derived from the outputs 67a', 86b' and 86c' are applied to the respective grids of three triodes 100a', 100b' and 100c' within the mixer circuit 90'. As shown in Fig. 5, all of the triodes in mixer circuit 90 are connected to their positive voltage supply through the plate resistor 101 of a bistable or "toggle" multivibrator 102 whose principal components are the triodes 103, 103'. In symmetrical manner, all the triodes of the mixer circuit 90' are connected to the said positive voltage supply through the other plate resistor 101' of this bistable multivibrator.

Considering the operating relations between the mixer circuit 90, 90' and the toggle multivibrator 102, each of the triodes in the mixer circuits will have an inverting effect on the pulses supplied to the grid of the triode. Thus, for example, the triode 100a in mixer circuit 90 will respond to the leading negative pulse 93a and to the lagging positive pulse 94a to develop a positive leading pulse 103a and to tend to develop a negative lagging pulse 104a. These last-named pulses would, in fact, appear as voltages across resistor 101, but, for convenience, the pulses 103a and 104a are shown in association with the triode 100a. In like manner, triode 100b will develop a positive pulse 103b and will tend to develop a negative pulse 104b, and triode 100c will develop a positive pulse 103c and will tend to develop a negative pulse 104c. All of these output pulses from the triodes of the mixer circuit 90 will appear across resistor 101 inasmuch as this resistor serves as a plate resistor for all three of these triodes.

The mixer circuit 90' operates in a similar manner in that the triodes of this last-named mixer circuit develop positive leading pulses and tend to develop negative lagging pulses alike to those developed by mixer circuit 90. All of the pulses developed by circuit 90' appear across the resistor 101' of bistable multivibrator 102. The positive pulses which are developed by the mixer circuit 90' and the negative pulses which tend to be developed thereby are designated in Fig. 5 as the pulse pairs 103a' and 104a', 103b' and 104b', and 103c' and 104c'.

Assume now that the toggle multivibrator 102 is in a normal state wherein the triode 103' is conducting and the triode 103 is nonconducting. Assume, further, that the variation in level of the signal at junction 42 is sufficient to operate channel 45a, but is not sufficient to operate channels 45b and 45c. Channel 45a, when so operated, causes the following sequence of events to occur. First, the mixer circuit 90' causes a positive pulse 103a' from triode 100a' to appear across the resistor 101' of the toggle multivibrator 102. The mentioned toggle multivibrator is, however, of a type which does not respond to positive pulses and, hence, the pulse 103a' is a superfluous pulse in the sense that it has no operational effect.

As the next step in the sequence, the mixer circuit 90 causes a positive pulse 103a from triode 100a to appear across the resistor 101 of the toggle multivibrator. Again, however, the toggle multivibrator, being insensitive to positive pulses, will not respond to the pulse 103a but will remain in its previous condition wherein the triode 103' is conducting and the triode 103 is nonconducting. From the examples given, it will be seen that, in fact, all of the positive leading pulses developed by the mixer circuits 90 and 90' are superfluous pulses.

As the third step in the sequence, the triode 100a in mixer circuit 90 will start to develop the negative pulse 104a. Such negative pulse, if applied to the plate of the nonconducting triode of multivibrator 102, and from thence through the cross-coupling of the multivibrator to the grid of the conducting triode, will, in its inception, trigger the multivibrator to change state. Hence, in the presently assumed instance, the initiation of the development of negative pulse 104a by triode 100a will cause the multivibrator 102 to "flop over" to the state wherein the triode 103 is conducting and the triode 103' is nonconducting. This new or "actuated" state assumed by the multivibrator will be manifested by the multivibrator at the plate of triode 103 by a drop in voltage from the supply voltage to some greatly lowered value. If visualized in terms of waveform, this sharp voltage drop at the plate of triode 103 represents the leading edge of a negative square wave 110 whose duration corresponds to the period for which the multivibrator 102 remains in the actuated state. As shown in Fig. 5, the waveform 110 is impressed on an output lead 111 for the Fig. 5 circuit. In developing waveform 110, the negative-going action of multivibrator 102 overrides the tendency of triode 100a to form pulse 104a so that the formation of this last-named pulse is never, in fact, fully completed.

As the fourth event in the sequence, the triode 100a' in mixer circuit 90' starts to develop a negative pulse 104a' across the resistor 101' of multivibrator 102. This pulse, inasmuch as it is negative and is applied to the plate of the multivibrator triode which is then nonconducting, is a pulse which meets the conditions for triggering the multivibrator 102 to change in state. Hence, the multivibrator responds to the inception of development of pulse 104a' to revert back to its original or "normal" state wherein the triode 103' is conducting and the triode 103 is nonconducting. This second change in state of the multivibrator 102 is accompanied at the plate of triode 103 by a sharp voltage rise which appears in waveform 110 as the lagging edge of the square wave. One full cycle of operation of the multivibrator 102 is thus completed.

Consider now the significance of the timing of the leading and lagging edges of waveform 110 and of the separation in time between these two edges. By tracing back through the time relations established in the Fig. 5 circuit, it will be seen that the leading edge of waveform 110 is a delayed manifestation of the leading slope of the trapezoidal wave 57a which appears at the output of the slicer circuit in channel 45a. Also, the lagging edge of waveform 110 is a manifestation with zero time delay of the lagging slope of the wave 57a. As will be described, by properly selecting the amount of time delay which exists between the leading edge of waveform 110 and the negative-going slope of wave 57a which is represented by this last-named leading edge, it is possible to adjust the duration of waveform 110 so that the said duration will be a standardized measure of the width of the scanned tone area represented by the trapezoidal wave 57a.

In like manner, the toggle multivibrator 102 may be triggered by negative pulses derived from the channel 45b or by negative pulses derived from the channel 45c to change from its normal state to an actuated state and to then revert from its actuated state back to its normal state to thereby develop negative square waves. These negative square waves will be similar to the waveform 110, but will be of different duration. Other than this difference in duration, the only difference between the waveform 110 produced by channel 45a and the negative multivibrator square waves produced by the action of channel 45b or channel 45c is that in the square waves produced by the latter channels, the lagging edge of the square waves will be manifestations with some time delay, rather than with zero time delay, of the lagging, positive-going slopes of the trapezoidal waves developed at the slicer circuit outputs in the channels 45b and 45c. All three channels have a similar cooperative relation with the multivibrator 102 in that any channel can trigger the multivibrator to change state only when a negative pulse is applied to the multivibrator, and only when this negative pulse is applied to the plate of the multivibrator which is nonconducting at the time of application of the pulse.

A better understanding of the over-all operation of the Fig. 5 circuit will be obtained from a study of Fig. 6. This last-named figure consists of the several diagrams A–Z. The significance of these diagrams is as follows.

Diagram A illustrates the scanning situation wherein a repetitive two-tone pattern is scanned by an aperture 10 having a length of six units in the scanning direction. The tone areas scanned by the aperture 10 and the width of these tone areas are, from left to right, as follows: A 2-unit black bar, a 6-unit white bar, a 2-unit black bar, a 6-unit white bar, a 4-unit black bar, a 4-unit white bar, a 4-unit black bar, a 4-unit white bar, a 6-unit black bar, a 2-unit white bar, and a 6-unit black bar. It will be noted that this pattern is such that the width in the scanning direction of any single bar is less than the length of aperture 10 in this direction, but that the sum of the widths of any black bar and adjacent white bar is greater than the length of the aperture. The conditions just mentioned are the conditions which have previously been stated as permitting a circuit in accordance with the invention to restore resolution to an image signal, representing a repetitive two-tone pattern even though the aperture length is greater than the width of one, some, or all of the individual bars.

Diagram B represents the signal produced at junction 42 (Fig. 5) as a result of the scanning of the pattern of diagram A by the aperture 10. In diagram B the waveform of the mentioned signal is represented by the solid line 120, while the slicing levels established by the separate slicer circuits in channels 45*a*, 45*b*, 45*c* are represented by the dotted lines 121*a*, 121*b* and 121*c*. It is evident in diagram B that the vertical coordinate represents signal level whereas the horizontal ordinate represents time. The time scale selected for diagram B is such that one unit of time in this scale corresponds to one unit of distance traversed by aperture 10 over the repetitive two-tone pattern in diagram A. Diagrams A and B are correlated in the sense that at any instant of time there will be vertical alignment between the position then occupied by the leading edge of aperture 10 in diagram A and the level then manifested by the waveform 120 in diagram B.

Diagrams C–Y are waveform diagrams which are drawn to the same time scale as diagram B and which are correlated in time with diagram B and with each other in the sense that there will be vertical alignment between all the respective points in diagrams B–Y which represent any given instant of time.

Diagrams C, D and E represent, respectively, the positive square waves 65*a*, 65*b*, 65*c* appearing at the outputs of the overdriven amplifier triodes 61*a*, 61*b*, 61*c* in Fig. 5. Diagrams F, G and H represent, respectively, the negative square waves 67*a*, 67*b*, 67*c* appearing in Fig. 5 at the outputs of the overdriven amplifier triodes 64*a*, 64*b*, 64*c*. Diagram I shows the negative trigger pulses 73*a* which are derived in channel 45*a* from the leading edges of the square waves 67*a* of diagram F. Diagram J shows the trigger pulses 94*a'* which are derived in channel 45*a* from the lagging edges of the square waves 65*a* in diagram C.

Diagrams K and L refer to channel 45*b* and represent, respectively, the trigger pulses 73*b* derived from the leading edges of the square waves 67*b* of diagram G, and the trigger pulses 74*b'* derived from the lagging edges of the square waves 65*b* in diagram D. Diagrams M and N refer to channel 45*c*, and these last-named diagrams represent, respectively, the trigger pulses 73*c* derived from the leading edges of the square waves 67*c* in diagram H, and the trigger pulses 74*c'* derived from the lagging edges of the square waves 65*c* in diagram E.

Diagrams O and P refer to channel 45*a*. In diagram O, the pulses 94*a* are delayed manifestations of the pulses 73*a* in diagram I. In diagram P, the pulses 94*a'* are manifestations with zero time delay of the pulses 94*a* of diagram J, or, in other words, are the same pulses. Diagrams Q and R refer to channel 45*b*. In these two diagrams, the pulses 94*b* are delayed manifestations of the pulses 73*b* (diagram K), while the pulses 94*b'* are delayed manifestations of the pulses 74*b'* (diagram L). Diagrams S and T refer to channel 45*c*. In these last-named diagrams, the pulses 94*c* are delayed manifestations of the pulses 73*c* (diagram M), while the pulses 94*c'* are delayed manifestations of the pulses 74*c'* (diagram N).

Diagram W represents the output of the mixer circuit 90. In diagram W, the pulses 104*a*, 104*b* and 104*c* are the output pulses from the mixer circuit 90, which are substantially coincident in time with, but are of inverse polarity to the input pulses 94*a*, 94*b* and 94*c*. In diagram W, one of the pulses appearing therein is given the double designation 104*a*, 104*b* while another of the pulses appearing therein is given the double designation 104*b*, 104*c*. This multiple designation is used to indicate that the pulse so designated is coincident in time with a pair of simultaneous input pulses to the mixer circuit 90. Thus, the pulse designated 104*a*, 104*b* is coincident in time with both the pulse 94*a* and the pulse 94*b*, while the pulse designated 104*b*, 104*c* is coincident in time with both the pulse 94*b* and the pulse 94*c*.

Diagram X represents the output of the mixer circuit 90'. The description just given of diagram W should make evident the nature of the pulses in diagram X and the significance of the designations given to the pulses in this last-named diagram.

Diagram Y is a diagram of the waveform impressed on lead 111 (Fig. 5) by the successive changes in state of the toggle multivibrator 102. Comparison of diagrams W, X and Y will indicate that each negative square wave in diagram Y is initiated by a negative trigger pulse from mixer circuit 90 (diagram W) and is terminated by a negative trigger pulse from mixer circuit 90' (diagram X). As a fact of perhaps more significance, a comparison of the negative square waves of diagram Y with the repetitive two-tone pattern of diagram A and with the trapezoidal wave intervals of diagram B will indicate that the negative square waves of diagram Y represent the black bars of the repetitive two-tone pattern without the loss in resolution which characterizes the trapezoidal wave intervals of diagram B. In fact, the negative square waves of diagram Y overcompensate for loss of resolution in that each negative square wave 110 has a duration which is less by one time unit than the number of time units which would be required to render the duration of the square wave a proportional measure of the width of the corresponding black bar in the pattern of diagram A. The purpose of this overcompensation will soon be described. For the time being, it is to be noted that the negative square waves of diagram Y provide a standardized measure of the width of the black bars in the two-tone pattern in that each negative square wave measures the width of its corresponding black bar in the same manner. More specifically, any negative square wave 110 in diagram Y can be translated into a proportional measure of the black bar represented thereby by utilizing the same translation procedure for each square wave, namely, adding one time unit to the duration of the square wave.

Diagram Z is a diagram of a reproducing aperture 10' having a length of one unit in the scanning direction, and, in addition, a diagram of the tone density of the tonal areas which will be exposed by the reproducing aperture upon a photosensitive medium when a reproducing light beam which passes through the aperture 10' is controlled by the signal represented in diagram Y. Comparison of diagrams X and Z will indicate that, because of the finite (one unit) length in the scanning direction of the reproducing aperture 10', the width of the reproduced tone areas in diagram Z will be greater than the widths which are actually called for by the durations of the negative square waves 110 in diagram Y. The amount by which the widths of the reproduced tone areas are so greater is, however, in each instance exactly equal to the one unit of length of aperture 10' in the scanning direction. This fact is of significance in that, it will be recalled, the measures of width provided by the square waves 110 are overcompensated in the sense that the durations thereof are each less by one unit than the number of units required to provide a proportional measure of the width of the black bars in the original pattern. In this view, it will be seen that the described overcompensation of the square waves 110 in diagram Y serves to nullify exactly the "aperture spread" effect of the reproducing aperture. Hence, the width of the reproduced tone areas in diagram Z will exactly duplicate the width of the original tone areas in the pattern of diagram A.

Having described the over-all operation of the Fig. 5 circuit by referring to the waveforms A–Z of Fig. 6, it is now necessary to consider the time delay requirements which permit the Fig. 5 circuit to operate in such manner that the reproducing aperture 10' will reproduce without loss of resolution the same pattern that was scanned by the image dissecting aperture 10.

Assume, first, that it is wished to produce a waveform Y wherein the square waves 110 do not include an anticipatory correction for the aperture spread of the reproducing aperture, but are instead intended to provide by their durations a proportional measure of the widths of the tone areas in the original pattern. With this end in mind, a comparison is first made between the 2-unit width of the first black bar at the left in diagram A and the width information provided by the time separation in diagrams I and J of the left-hand pulses 73*a* and 94*a*' which represent this black bar. It will be found that these two pulses are spaced apart in time by the equivalent of six units of width. Hence, in order to produce a proper representation by the left-hand pulses 73*a*, 94*a*' of this left-hand black bar, it is necessary to change the interpulse time relation established by these pulses so that there will be produced two pulses which will be separated in time by the equivalent of the two units of width characterizing the black bar. This change in interpulse time relation is effected by selecting circuit constants for the monostable multivibrator 80*a*, 81*a* (Fig. 5) so that this multivibrator introduces a time delay equivalent to four units of width between pulse 73*a* and its replacing pulse 94*a* (diagram O), and by introducing no time delay between the pulse 94*a*' in diagram J and the pulse 94*a*' in diagram P. By introducing this selected amount of time delay through the action of the multivibrator 80*a*, 81*a*, the pulses 94*a* and 94*a*' in diagrams O and P will be rendered separated by the equivalent of two units of width, and it will follow that the corresponding waveform 110 generated in diagram Y will have a duration equivalent to two units of width. In other words, the mentioned square wave 110 will have a duration which is a proportional measure of the width of the black bar represented by the square wave. The obtainment of this proportional measure is attained, however, at the expense of introducing a 4-unit time delay in the reproduction of the left-hand black bar of the original pattern.

Next, let us consider in diagram A the left-hand black bar of four units width, and let us also consider in diagrams K and L the left-hand pulses 73*b* and 74*b*' whose time separation initially represents the width of this 4-unit black bar. It will be found that the pulses 73*b* and 74*b*' are separated in time by the equivalent of four units of width, and, hence, are properly separated by the correct amount inter se to represent the width of the 4-unit black bar in a proportional manner. This proper time separation inter se of the pulses 73*b*, 74*b*' is, however, not enough to properly reproduce the scanned tone pattern inasmuch as the mentioned pair of pulses must not only represent the width of the black bar to which they correspond, but must also represent in a proportional manner the relative spacing of this bar from the other bars in the repetitive two-tone pattern. To attain this proper relative spacing, it would appear, at first impression, that it would be necessary to delay each of pulses 73*b* and 74*b*' by the equivalent of four width units, inasmuch as a 4-unit time delay was introduced into the reproduction of the 2-unit black bar which was previously discussed. It will be found, however, that the pulses 73*b* and 74*b*' have already, in effect, been delayed by two units relative to the left-hand pulse 73*a* which was used to reproduce the discussed 2-unit black bar. This is so since, as shown by the section of waveform 120 (diagram B) under the left-hand, 4-unit bar (diagram A), a period equivalent to two units of width elapses between the time when the waveform 120 of diagram B is at the level 121*a* at which pulse 73*a* is developed and the time at which this waveform is at level 121*b* at which pulse 73*b* is developed. If, however, as is the fact, the pulses 73*b* and 74*b*' have already been delayed by two units relative to the left-hand pulse 73*a*, it is necessary only to subject each of the pulses 73*b* and 74*b*' to an additional 2-unit delay in order to preserve in the reproduced pattern the relative spacing between bars of the original pattern. This additional 2-unit delay is effected by selecting the circuit constants of each of the monostable multivibrators 80*b*, 81*b*, and 80*b*', 81*b*' (Fig. 5) so that these multivibrators will produce a delay equivalent to two width units between pulse 73*b* and its replacing pulse 94*b*, and between pulse 74*b*' and its replacing pulse 94*b*'.

The last bar of the pattern of diagram A which will be considered is the left-hand black bar of six units width. The width of this bar is originally represented by the time separation between the left-hand pulses 73 and 74*c*' in diagrams M and N. By exactly the same reasoning as before, it can be shown that this 6-unit bar will have its width represented in proportional measure by the time separation between pulses, and will also have its proper relative spacing in the pattern properly represented by the timing of the pulses, if the pulse 73*c* is subjected to a zero time delay, and if the pulse 74*c*' is subjected to a 4-unit time delay. These time delays may be introduced by eliminating the differentiator circuit 71*c*, 72*c* and monostable multivibrator 80*c*, 81*c* (Fig. 5) so that the pulse 94*c* (diagram S) is developed with zero time delay, and by selecting the circuit constants of the monostable multivibrator 80*c*', 81*c*' (Fig. 5) so as to introduce a time delay equivalent to four width units between the pulse 74*c*' and its replacing pulse 94*c*'.

To summarize the foregoing, if it is desired to render the durations of the square waves 110 of diagram Y a proportional measure of the width of the black bars in diagram A which are represented by these square waves, this can be done by delaying the initially developed leading and lagging trigger pulses of the channels 45*a*, 45*b*, 45*c* in accordance with a schedule of time delays which properly correlates the timing of the pulses from channel to channel, and which also properly correlates the relative timing of leading and lagging pulse pairs in the same channel. In the situation presented by diagram A, the appropriate time delay schedule to render the durations of the square waves 110 a proportional measure of the black bars is as follows:

| | Leading Pulse | Lagging Pulse |
|---|---|---|
| Channel 45*a* | 4 units delay | 0 delay. |
| Channel 45*b* | 2 units delay | 2 units delay. |
| Channel 45*c* | 0 delay | 4 units delay. |

While the durations of the square waves 110 may thus be made a proportional measure of the width of the bars represented thereby, it is often desirable, as earlier mentioned, to take the further step of including within the durations of these square waves an anticipatory correction for the loss of resolution which will be incurred when an aperture is utilized to reproduce the scanned pattern. If such anticipatory correction is introduced into the mentioned square waves, the durations of these square waves will, for reasons heretofore mentioned, become a standardized measure rather than a proportional measure of the width of the bars represented by the square waves.

It has been previously demonstrated that, in the scanning situation presented by diagram A and in the reproducing situation presented by diagram Z, a proper anticipatory correction will be obtained when the duration of each of the square waves 110 in diagram Y is less by the equivalent of one width unit than the duration which would be necessary to provide a proportional measure of the width of the scanned bar corresponding to the square wave. By the same line of reasoning as developed above for the instance where it was desired to make the durations of the square waves a proportional measure of the bar widths, it can be shown that the one-unit anticipatory correction can be introduced into the square waves 110 by adopting for the Fig. 5 circuit a schedule of time delays as follows:

| | Leading Pulse | Lagging Pulse |
|---|---|---|
| Channel 45a | 5 units delay | 0 delay. |
| Channel 45b | 3 units delay | 2 units delay. |
| Channel 45c | 1 unit delay | 4 units delay. |

The schedule of time delays just listed is the schedule which is actually used for the Fig. 5 circuit. This schedule of time delays is realized by selecting appropriate circuit constants for each of the monostable multivibrators shown in the Fig. 5 circuit, so that multivibrator 80a, 81a gives a time delay of five units; multivibrator 80b, 81b gives a delay of three units; multivibrator 80c, 81c gives a delay of one unit; multivibrator 80b′, 81b′ gives a delay of two units; and multivibrator 80c′, 81c′, gives a delay of four units.

The above-described embodiment being exemplary only, it will be understood that the invention comprehends embodiments differing in form or detail from the embodiment which has just been described. For example, the number of level detecting channels can be increased as desired to increase the resolution restoring capabilities of a circuit according to the invention. Moreover, circuit components other than those shown in Fig. 5 may be utilized in the practice of the invention. Thus, for example, inductance-capacitance time delay networks may be utilized in place of the monostable multivibrators of the Fig. 5 circuit to provide a time delay effect. Accordingly, the invention is not to be considered as limited save as is consonant with the scope of the following claims.

I claim:

1. Apparatus comprising, means defining an image-dissecting scanning spot adapted to scan in a predetermined direction a tone pattern which is formed of darker and lighter tone areas, photoelectric means responsive to light received from said spot while scanning said pattern to translate said light into a signal with a time-varying waveform wherein scanned tone areas of differing width in the scanning direction are represented by corresponding intervals of said waveform which differ among themselves in level, a plurality of channels connected to receive said time-varying waveform signal and respectively including a plurality of slicing circuits which have different threshold levels at which said circuits become signal responsive, and which are adapted by respectively and selectively responding to said signal at the different levels characterizing said differing intervals to produce respective channel signals providing timed indications in each channel of the time intervals occupied by those waveform intervals which are at the particular level at which the slicing circuit of such channel becomes signal responsive, and a reconstituting circuit responsive to all said channel signals and operable in synchronism with the timed indications provided thereby to reconstitute therefrom said time-varying waveform signal in a form thereof wherein said intervals are similar level intervals representing said differing width tone areas.

2. Apparatus comprising, means defining an image-dissecting scanning spot adapted to scan in a predetermined direction a tone pattern which is formed of darker and lighter tone areas, photoelectric means responsive to light received from said spot while scanning said pattern to translate said light into a signal with a time-varying waveform wherein scanned tone areas of differing width in the scanning direction are represented by corresponding intervals of said waveform which differ among themselves both in level and in duration, the durations of said intervals departing from true measures of said area widths by a variable error factor introduced by the imperfect resolution provided by said scanning spot in the scanning direction, a plurality of channels connected to receive said time-varying waveform signal and respectively including a plurality of slicing circuits which have different threshold levels at which said circuits become signal responsive, and which are adapted by respectively and selectively responding to said signal at the different levels, characterizing said differing intervals, to produce respective channel signals which indicate the durations of the associated intervals, a plurality of time delay circuits operable in said channels for respectively delaying at least some of said channel signals in differing amounts to correlate the timing thereof so as to eliminate said variable error factor from the duration indications thereof, and a reconstituting circuit responsive to said channel signals as so correlated in timing and operable in synchronism therewith to reconstitute therefrom said time-varying waveform signal in a form thereof wherein the durations of said intervals are corrected for the imperfect resolution of said scanning spot.

3. Apparatus as in claim 2 wherein said plurality of time delay circuits are operable to introduce into the duration indications of said channel signals an anticipatory correction for the loss of resolution incurred when said differing width tone areas are reproduced by a scanning spot which is controlled by the reconstituted signal.

4. Apparatus comprising, means defining an image-dissecting scanning spot adapted to scan in a predetermined direction a tone pattern which is formed of darker and lighter tone areas, photoelectric means responsive to light received from said spot while scanning said pattern to translate said light into a signal with a time-varying waveform wherein scanned tone areas of differing width in the scanning direction are represented by corresponding intervals of said waveform which differ among themselves in level, a plurality of separate channels having respective circuits to slice the waveform of said signal at the different levels characterizing said intervals and, thereafter, to square up the signals resulting from the slicing to thereby produce square wave signals which are respective to said channels and by which said differing width tone areas are respectively represented, a plurality of differentiator circuits respectively connected in said channels to translate the square wave signals of said channels into pairs of time-separated pulses whereupon said differing width tone areas become respectively represented by pulse pairs in different of said channels, a plurality of first delay circuits connected in said channels to respective ones of said differentiator circuits to delay one of the pulses of at least some of said pulse pairs in accordance with a first channel-to-channel schedule of time delays which is preselected to render the inter-channel relative timing of said one pulses a standardized measure of the relative position in said scanning direction of the corresponding tone areas of differing width, a plurality of second delay circuits connected in said channels to respective ones of said differentiator circuits to delay the other of the pulses of at least some of said pulse pairs in accordance with a second channel-to-channel schedule of time delays which is correlated with said first schedule to render the intrapulse times of said pulse pairs in said different channels a standardized measure of the widths of the differing width tone areas represented by said pulse pairs, and a reconstituting circuit responsive to the pulse pairs from each of said channels to reconstitute therefrom said time-varying waveform in a form thereof wherein said intervals are standardized measures both of the relative positions and of the widths in said scanning direction of said differing width tone areas.

5. Apparatus as in claim 4 wherein said second schedule of time delays is correlated with said first schedule of time delays to render the intrapulse times of each pulse pair in said different channels substantially equal to $$\frac{w-l}{s}$$

where $w$ is a variable representing the width of the tone area corresponding to the pulse pair, $l$ is the spot length of a reproducing scanning spot which is controlled by the reconstituted signal, and $s$ is the scanning speed of the image-dissecting and reproducing scanning spots.

6. Apparatus comprising, means defining an image-dissecting scanning spot adapted to scan in a predetermined direction a tone pattern which is formed of darker and lighter tone areas, photoelectric means responsive to light received from said spot while scanning said pattern to translate said light into a signal with a time-varying waveform wherein scanned tone areas of differing width in the scanning direction are represented by corresponding intervals of said waveform which differ among themselves in level, a plurality of separate channels having respective circuits to slice the waveform of said signal at the different levels characterizing said intervals and, thereafter, to square up the signals resulting from the slicing to thereby produce square wave signals which are respective to said channels and by which said differing width tone areas are respectively represented, a plurality of differentiator circuits respectively connected in said channels to translate the square wave signals of said channels into respective pairs of time-separated leading and lagging pulses whereupon said differing width tone areas become respectively represented by said pulse pairs in different of said channels, a plurality of first delay circuits connected in said channels to respective ones of said differentiator circuits, said first delay circuits being operable only on said leading pulses to delay the leading pulses of at least some of said pulse pairs in accordance with a first channel-to-channel schedule of time delays which is preselected to render the interchannel relative timing of said leading pulses a standardized measure of the relative position in said scanning direction of the corresponding tone areas of differing width, a plurality of second delay circuits connected in said channels to respective ones of said differentiator circuits, said second delay circuits being operable only on said lagging pulses to delay the lagging pulses of at least some of said pulse pairs in accordance with a second channel-to-channel schedule of time delays which is correlated with said first schedule to render the intrapulse times of said pulse pairs in said different channels a standardized measure of the widths of the differing width tone areas represented by said pulse pairs, a first mixer circuit connected to the first delay circuits of each of said channels to combine said leading pulses as delayed by said first schedule into a first train of pulses, a second mixer circuit connected to the second delay circuits of each of said channels to combine said lagging pulses as delayed in accordance with said second schedule into a second train of pulses, and a reconstituting circuit having first and second states and connected with said first and second mixer circuits to be alternately switched in state by pulses from said first train and pulses from said second train to thereby reconstitute therefrom said time-varying waveform in a form thereof wherein said intervals are standardized measures both of the relative positions and of the widths in said scanning direction of said differing width tone areas.

7. Apparatus as in claim 6 wherein said leading and lagging pulses of said pulse pairs are derived by said slicer and differentiator circuits from negative-going and from positive-going portions, respectively, of the time-varying waveform of the signal from said photoelectric means.

8. Apparatus as in claim 6 wherein said first and second delay circuits are monostable electron tube circuits.

9. Apparatus as in claim 6 wherein both said first and second delay circuits respond to pulses of common polarity and of one polarity only to provide a time delay effect, said apparatus being further characterized by, a plurality of first amplifier stages respectively connected in said channels between said slicer circuits and the differentiator circuits which supply pulses to said first delay circuits, and a plurality of second amplifier stages connected between said first amplifier stages, the differentiator circuits which supply pulses to said second time delay circuits, said first and second amplifier stages respectively causing said first and second time delay circuits to be responsive to, respectively, the leading and lagging pulses of said pulse pairs which are developed by said differentiator circuits.

10. Apparatus as in claim 6 wherein said reconstituting circuit is a bistable multivibrator.

11. Apparatus as in claim 6 wherein said means defining said image-dissecting scanning spot comprises a member adapted to move in said scanning direction over said tone pattern and having formed therein a scanning aperture by means of which said scanning spot is defined as the area of the beam of light which passes from said pattern through said aperture to said photoelectric means.

12. Apparatus as in claim 6 wherein said slicer circuits are biased rectifier circuits.

References Cited in the file of this patent

UNITED STATES PATENTS 2,636,936 Goldsmith ------------ Apr. 28, 1953